United States Patent [19]

van den Elzen et al.

[11] 4,349,889
[45] Sep. 14, 1982

[54] NON-RECURSIVE FILTER HAVING ADJUSTABLE STEP-SIZE FOR EACH ITERATION

[75] Inventors: Hendricus C. van den Elzen; Petrus J. Van Gerwen; Wilfred A. M. Snijders; Nicolaas A. M. Verhoeckx, all of Eindhoven, Netherlands

[73] Assignee: U.S. Philips Corporation, New York, N.Y.

[21] Appl. No.: 168,211

[22] Filed: Jul. 10, 1980

[30] Foreign Application Priority Data

Jul. 18, 1979 [NL] Netherlands ............... 7905577

[51] Int. Cl.³ .................................... G06F 15/34
[52] U.S. Cl. ................................ 364/724; 375/16
[58] Field of Search ............... 364/724; 375/14, 16; 333/18

[56] References Cited

U.S. PATENT DOCUMENTS

| | | | |
|---|---|---|---|
| 3,633,105 | 4/1972 | Lender et al. | 364/724 X |
| 3,736,414 | 5/1973 | McAuliffe | 364/724 |
| 3,930,147 | 12/1975 | Bellanger et al. | 364/724 |
| 3,992,616 | 11/1976 | Acker | 375/14 X |
| 4,032,762 | 6/1977 | Caloyannides | 375/16 X |
| 4,121,295 | 10/1978 | Witt | 364/724 |
| 4,145,747 | 3/1979 | Sakaki et al. | 364/724 |

*Primary Examiner*—David H. Malzahn
*Attorney, Agent, or Firm*—Thomas A. Briody; William J. Streeter; Edward W. Goodman

[57] ABSTRACT

Arrangement having a non-recursive filter and means for weighting a sequence of delayed versions of the input signal in accordance with a sequence of coefficients which are each adjusted iteratively by positive and negative correction steps, respectively, with variable step-sizes, the step-size parameter being selected for each iteration and for each coefficient by means of a run-length detector to which the sign of each correction step is applied and which selects a larger or a smaller step-size parameter depending on the number of correction steps having the same sign and preceding the relevant iteration.

Use: echo canceller, equalizer.

6 Claims, 8 Drawing Figures

NON-RECURSIVE FILTER HAVING ADJUSTABLE STEP-SIZE FOR EACH ITERATION

BACKGROUND OF THE INVENTION (1) Field of the Invention

The invention relates to an arrangement comprising a non-recursive filter having an input circuit and means coupled to this input circuit for generating a sequence of delayed versions of a signal applied to said input circuit, an output circuit formed by a summing device, a comparator connected to said output circuit, means for applying the filter output signal and a reference signal to said comparator to produce an error signal, and means for weighting said sequence of delayed versions of the input signal in accordance with a sequence of coefficients which are each iteratively adjusted, having variable step-sizes for minimizing a prescribed function of said error signal.

Filters of the above-defined type are known in an analog as well as a digital construction and are, for example used in devices, such as echo cancellers, for "full-duplex" data transmission over two-wire circuits and equalizers for equalizing dispersive channels for data transmission.

Adjusting the filter coefficients can be done in different manners. A method which is used for equalization in particular consists in that the filter coefficients are adjusted in a time interval preceding the actual data transmission, the so-called "training" period, whereafter they are held at the adjusted values during the actual data transmission or are re-adjusted in a wholly adaptive manner, the received data signal being detected and used as the reference signal.

As is known, use can be made of different kinds of algorithms, such as, for example, the "sign" algorithm, the stochastic iteration algorithm and the correlation algorithm, for the control of such filters. For each of these algorithms a choice must be made for the value of the step-size parameter ($\alpha$) in each of N control loops by means of which the N filter coefficients can be adjusted. Two factors, namely the adjusting period required and the final error are predominantly decisive for the choice of the value of the step-size parameter ($\alpha$). A higher value of the step-size parameter ($\alpha$) results in a more rapid convergence and, consequently, a shorter adjusting period, but also results in a greater final error. When the step-size parameter ($\alpha$) has a constant value which is not time-variant and which is also the same for all N coefficients, this implies that the choice of the value of the step-size parameter ($\alpha$) is based on a compromise. The fact that a relatively long adjusting period of the filter must be tolerated is then often the result of the maximum final error which is still permissible in practice.

The invention results from investigations into the possibility to work with a step-size parameter ($\alpha$) whose value can be varied.

(2) Description of the Prior Art

It is assumed that the practical implementation of a non-recursive filter as well as the arrangements in which such a filter is used are sufficiently known from the great number of publications in this field of the art.

Reference is made to reference (D.1), more in particular to FIGS. 1, 2, 3 and 4 thereof and the associated text, as an example of possible analog embodiments of a non-recursive filter used in an adaptive equalizer. A possible digital embodiment of a non-recursive filter used in an adaptive equalizer is disclosed in, for example, reference (D.2).

In the embodiments known from the above-mentioned references (D.1) and (D.2), the step-size parameter ($\alpha$) has a constant value which entails, as it must be of small value in order to cause the maximum final error to be small, that the adjusting period is relatively long.

In order to realize an improved convergence and consequently a shorter adjusting period it is already known to use a variable step-size parameter ($\alpha$). Reference (D.3), for example, describes an adaptive equalizer provided with a non-recursive filter for a synchronous data transmission system, wherein use is made of two different predetermined step-size parameters $\alpha_1$ and $\alpha_2$, wherein $\alpha_1 >> \alpha_2$ to improve the speed of convergence. Therein the choice of the proper step-size parameter is time-dependent and determined by the beginning and the end of the adjusting period preceding the actual data transmission, the so-called "training" period. Thus, the higher value step-size parameter $\alpha_1$ is selected at the instant the "training" period starts and the lower value step-size parameter $\alpha_2$ is selected at the instant the "training" period ends. This strategy has the drawback that at the instant the lower value step-size parameter $\alpha_2$ is selected, there is as yet no certainty that the error has been reduced to a sufficient extent. This strategy has furthermore the inherent limitation that it can only be used when the actual data transmission is preceded by a "training period".

Another selection criterion disclosed in, for example, reference (D.4) consists in that the higher value step-size parameter $\alpha_1$ is selected when the amplitude of the error signal exceeds a predetermined fixed reference value, whereas the lower value step-size parameter $\alpha_2$ is selected when the amplitude of the error signal is below the said reference value. This strategy can indeed be used without the need for a "training" period preceding the actual data transmission but, owing to the use of a fixed reference value, it has the inherent limitation that it can only be used when the level of the signal received in the terminal station varies only a little, because the amplitude of the error signal is also depending on the level of the received signal. As in practice the terminal station must be capable of processing information received over different transmission paths, it is possible that the received signal level varies to a relatively great extent, depending on the transmission path followed. Therefore, this strategy also is not very suitable for use in practice.

It will be clear that the number of possible step-size parameters to be selected need not be restricted to two. References (D.5) and (D.6) concern themselves with theoretical considerations of the optimum variation of the step-size parameter ($\alpha$) as a function of the time and as a function of the N coefficients. However, a simple practical implementation cannot be derived therefrom.

SUMMARY OF THE INVENTION

The invention has for its object to provide an arrangement having a non-recursive filter of the type described in the opening paragraph and wherein the step-size for each iteration being determined by a step-size parameter selected from one out of several step-size parameters of different values, and more in particular has for its object to enlarge the usability of such an arrangement by the use of a selection criterion which obviates the limitations mentioned in the foregoing to a very great extent and which can, in addition, be implemented in a simple manner.

The arrangement according to the invention is characterized in that the step-size parameter is selected for each iteration and for each coefficient by means of a run-length detector to which the sign of each correction step is applied and which, depending on the number of correction steps of the same sign occurring within a group of correction steps preceding the relevant iteration, selects a larger or a smaller step-size parameter.

The invention is based on the recognition of the fact that the statistical properties of the signs of the consecutive correction steps of each of the coefficients provide a criterion on the basis of which it can be unambiguously determined whether the adaptive filter is in the adjusting phase or already in the properly adjusted phase.

BRIEF DESCRIPTION OF THE DRAWINGS

The invention and its advantages will now be further explained by way of example with reference to the drawings. Therein.

REFERENCES (1) Donald Hirsch et al., "A Simple Adaptive Equalizer for Efficient Data Transmission", IEEE Transactions, Vol. COM-18, No. 1, February 1970, pp. 5–12.

(2) Adam Lender, "Decision-Directed Digital Adaptive Equalization Technique for High-Speed Data Transmission", IEEE Transactions, Vol. COM-18, No. 5, October 1970, pp. 625–632.

(3) G. Ungerboeck, "Theory on the Speed of Convergence in Adaptive Equalizers for Digital Communication", IBM Journal of Research Development, November 1972, pp. 546–555.

(4) R. W. Lucky et al., "Principles of Data Communication", McGraw-Hill Book Company, pp. 154, par. 6.2.2.

(5) Tibor J. Schonfeld et al., "A Rapidly Converging First-Order Training Algorithm for an Adaptive Equalizer," IEEE Transactions, Vol. IT-17, No. 4, July 1971, pp. 431–439.

(6) Tibor J. Schonfeld et al., "Rapidly Converging Second-Order Tracking Algorithms for Adaptive Equalization", IEEE Transactions, Vol. II-17, No. 5, September 1971, pp. 572–579.

(7) Lawrence R. Rabiner et al., "Terminology in Digital Signal Processing," IEEE Transactions, Vol. AU-20, No. 5, December 1972, pp. 322–327.

(8) A Pass band data-drive echo canceller for full-duplex transmission on two-wire circuits; S. B. Weinstein; IEEE Transactions on Communications, Vol. COM-25, No. 7, July 1977; pp. 654–666.

DESCRIPTION OF THE EMBODIMENTS (1) General Description

Figure 1:
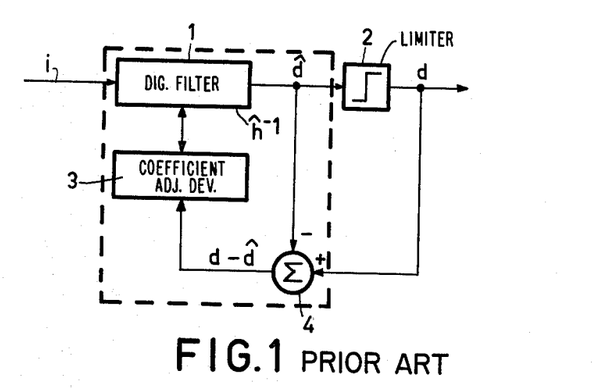
FIG. 1 shows the circuit diagram of a known arrangement for the equalization of dispersive channels for data transmission.

FIG. 1 shows the circuit diagram of a known arrangement for equalization of dispersive channels for data transmission. In this Figure reference numeral 1 denotes an adaptive digital transversal filter to which an input signal i is applied. The filter then produces an output signal $\hat{d}$ which, after having been limited in a limiter 2 connected to the filter, produces an output signal d. The filter transfer characteristic is adaptable by adjustment of the filter coefficients. This adjustment of the filter coefficients is effected automatically in an iterative manner by means of a coefficient adjusting device 3 which is controlled by an applied error signal $d - \hat{d}$. This error signal is derived from the output of a difference determining circuit 4 to which the limited and the non-limited filter output signals d and $\hat{d}$, respectively, are applied to generate the error signal $d - \hat{d}$.

Figure 2:
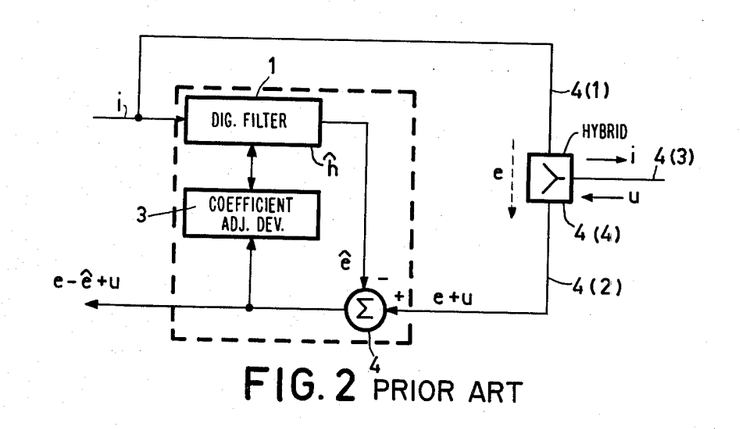
FIG. 2 shows the circuit diagram of a known arrangement for echo cancellation for data transmission over two-wire circuits.

FIG. 2 shows the circuit diagram of an echo canceller for use in a transmission system consisting of a one-way transmit path 4 (1), a one-way receive path 4(2) and a two-way path 4(3). These different paths are interconnected by means of a hybrid coupling network 4(4). This arrangement also comprises an adaptive digital transversal filter 1 whose coefficients are iteratively adjusted by means of a coefficient adjusting device 3.

Applied to the transmit path 4(1) is a signal i to be transmitted, which is also applied to the input of the filter 1 to generate an echo cancelling signal $\hat{e}$ which is subtracted in a difference determining circuit 4 from a signal e+u, which is also applied to this difference determining circuits 4 and is formed by the sum of a signal u applied to the coupling network 4(4) via the two-way path 4(3) and an echo signal e introduced into the receive path 4(2) in response to the signal i applied via the transmit path 4(1) to the coupling network 4(4). The residual error signal $e - \hat{e} + u$, occurring at the output of the difference determining circuit 4, is applied to the coefficient adjusting device 3 for adjusting the filter coefficients on the basis of this residual error signal.

With this use of the filter (echo cancellation) a given, but unknown, transfer function (h) must be imitated to the best possible extent $(\hat{h})$. In the use of the filter described with reference to FIG. 1 (equalization) the inverse $(h^{-1} = 1/h)$ of a given, but unknown transfer function must be imitated to the best possible extent $(\hat{h}^{-1})$. There is a great deal of agreement between the two situations. For equalization (FIG. 1) the dynamic behaviour of the arrangement can best be judged on the basis of the error signal $d - \hat{d}$, whereas for echo cancellation (FIG. 2) the ratio $e - \hat{e}/u$ is the most suitable criterion.

Hereinafter it will be explained in what manner the dynamic behaviour of an echo canceller according to the invention can be improved. It will, however, be clear that the invention is not limited to echo cancellation but that it offers similar advantages when used in other applications of adaptive filters, such as for example, in equalizers.

Figure 3:
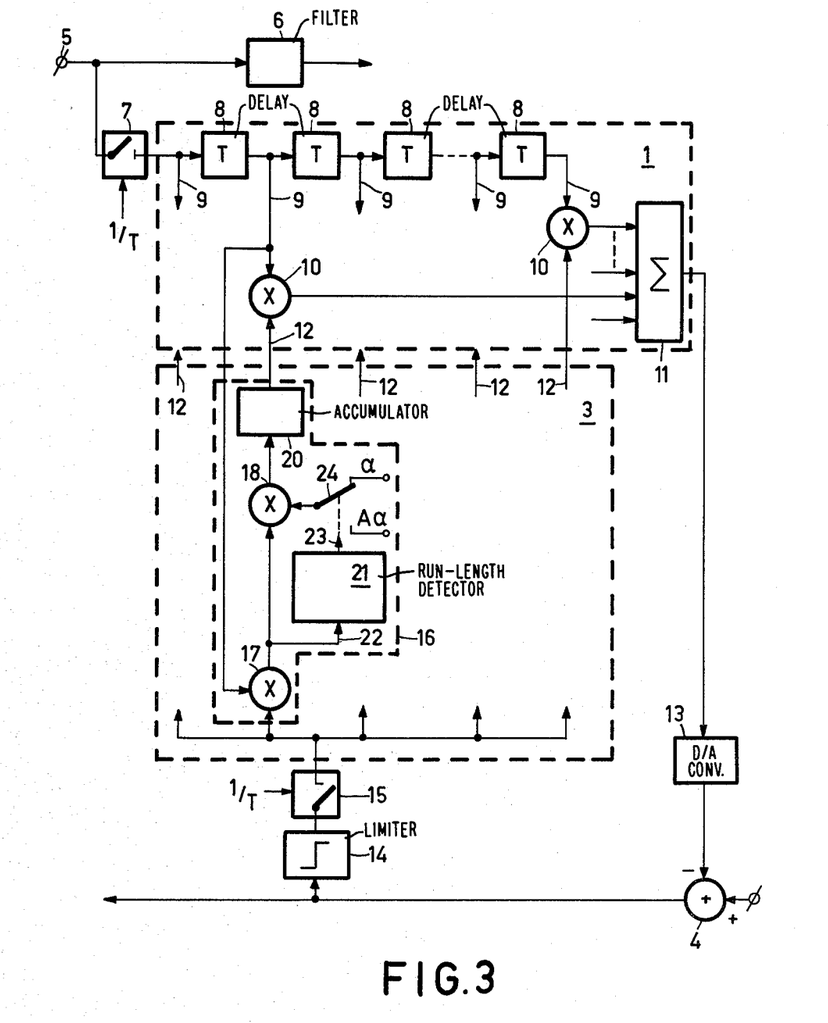
FIG. 3 shows a possible embodiment of an echo canceller according to the invention.

(2) Description of FIG. 3

FIG. 3 shows a possible embodiment of an echo canceller. Therein the boxed portion 1 represents the adaptive transversal filter and the boxed portion 3 is the coefficient adjusting device. Reference numeral 5 denotes an input terminal to which a data signal to be transmitted is applied with symbol rate 1/T for transmission via a filter 6. The data signal, occurring at the input terminal 5, is also applied to a sampling device 7, in which the data signal is sampled with a sampling rate 1/T. The signal thus sampled is applied to the input of the adaptive transversal filter 1. This filter 1 comprises a plurality of series-arranged delay elements 8 each having a time delay T for generating respective time-delayed versions of the filter input signal at respective taps 9. The filter 1 further comprises a number of multipliers 10 corresponding to the number of taps 9, the FIG. 3 showing for simplicity only two of these multipliers, as well as a summing device 11 to which the output of each of these multipliers 10 is connected. In the multipliers 10, which are connected to an associated tap 9 by means of a first input and to an associated output 12 of the coefficient adjusting device 3 by means of a second input, respectively, the delayed versions of the filter input signal are respectively multiplied by the associated filter coefficient produced by the coefficient adjusting device 3, to be thereafter summed in the summing device 11. Via a digital-to-analog converter 13 the output of the summing device 11 is connected to a difference determining circuit 4, wherein the filter output signal, occurring at the output of the summing device 11 and converted into an analog signal, is subtracted from an incoming signal applied to a second input of the comparator 4, for generating a residual error signal.

Via a slicer 14, this residual error signal is applied to a sampling device 15 wherein the residual error signal is sampled with the sampling rate 1/T. The signal thus sampled is representative of the sign of the residual error signal occurring at the sampling instants and this signal is applied to the coefficient adjusting device 3. This device 3 comprises a number of correlators 16 which correspond with the number of multipliers 10 and are identical in construction. For the sake of simplicity only one of these correlators is shown in the FIG. 3.

More particularly, each correlator 16 comprises a first and a second multiplier 17 and 18, respectively, and an accumulator 20. The first multiplier 17 has a first input to which the output signal of the sampling device 15 is applied, which signal is representative of the sign of the residual error signal, and a second input to which the output signal of the relevant tap 9 is applied. The output signal of this first multiplier 17 is applied to a first input of the second multiplier 18, to a second input of which one out of several step-size parameters each of a different values ($\alpha$, $A\alpha$, ...), is applied. The products occurring at the output of the second multiplier 18 are accumulated in the accumulator 20. The signal obtained by correlation can be derived as a filter coefficient from the output 12 of the accumulator 20. Each output signal of the respective correlator 16 is applied to the associated multiplier 10 of the adaptive transversal filter 1.

The strategy used in this embodiment in each of the correlators 16 to determine the new filter coefficient, consists in that the filter coefficient, stored in the accumulator 20 and being the result of preceding correlation intervals, is corrected, the sign of the correction step being determined by the product of the sign of the residual error signal (e−ê+u) at the sampling instant and the sign of the time-delayed filter input version derived from the relevant tap 9, the size of the correction step being determined by the selected step-size parameter $\alpha$ or $A\alpha$.

The factor A is a design quantity which for practical reasons is preferably a power of 2 (for example 16 or 256). In order to obtain a rapid convergence and consequently a short adjusting time, the large step-size parameter $A\alpha$ must be selected at the beginning of the adjusting phase and the small step-size parameter must be selected as soon as the properly adjusted state is almost obtained. Accurate investigation has shown that the statistical properties of the signs of the consecutive corrections of each of the filter coefficients provide a criterion on the basis of which it can be unambiguously determined whether the adaptive filter is in its adjusting phase or substantially or wholly in the properly adjusted phase. Namely, in the properly adjusted phase these signs form a sequence of $+1$ and $-1$ values which, into a first approximation, are independent and equally probable. In contrast therewith it appears that at the beginning of the adjusting phase, large uninterrupted groups ("runs") of $+1$ or $-1$ values occur.

Using these statistical properties of the signs of consecutive corrections of each of the coefficients, a particularly favourable and advantageous arrangement is obtained in that, in accordance with the invention, the step-size parameter per iteration and per coefficient is selected by means of a run length detector to which the sign of each correction step is applied and which, depending on the number of correction steps with the same sign preceding the iteration, selects a higher or a lower step-size parameter.

More particularly, in the embodiment shown in FIG. 3, each of the correlators 16 comprises its own run-length detector 21 having an input 22 to which the signal, occurring at the output of the first multiplier 17 and representative of the sign of the correction step, is applied. The run-length detector 21 produces, on the basis of the detection criterion, a switching signal which occurs at its output 23 and which is used to control a two-position switch 24, which is preferably implemented as an electronic switch. Both in the quiescent state and when the filter is in its properly adjusted phase, this switch is in the position shown in the Figure, so that the step-size parameter $\alpha$ is applied to the second multiplier 18.

Figure 4:
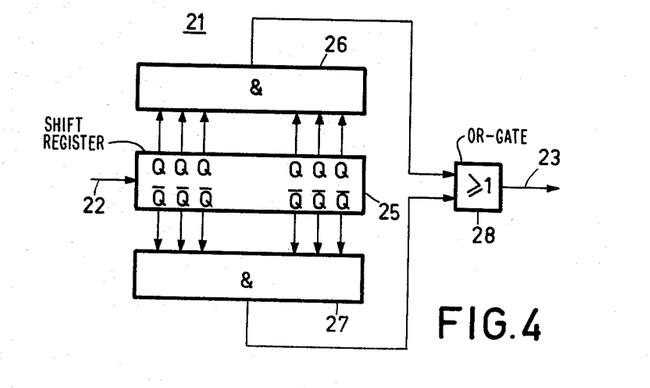
FIG. 4 shows a possible embodiment of a run-length detector used in the arrangement shown in FIG. 3, FIGS. 5 and 6 show diagrams to explain the detection criterion.
Figure 5:
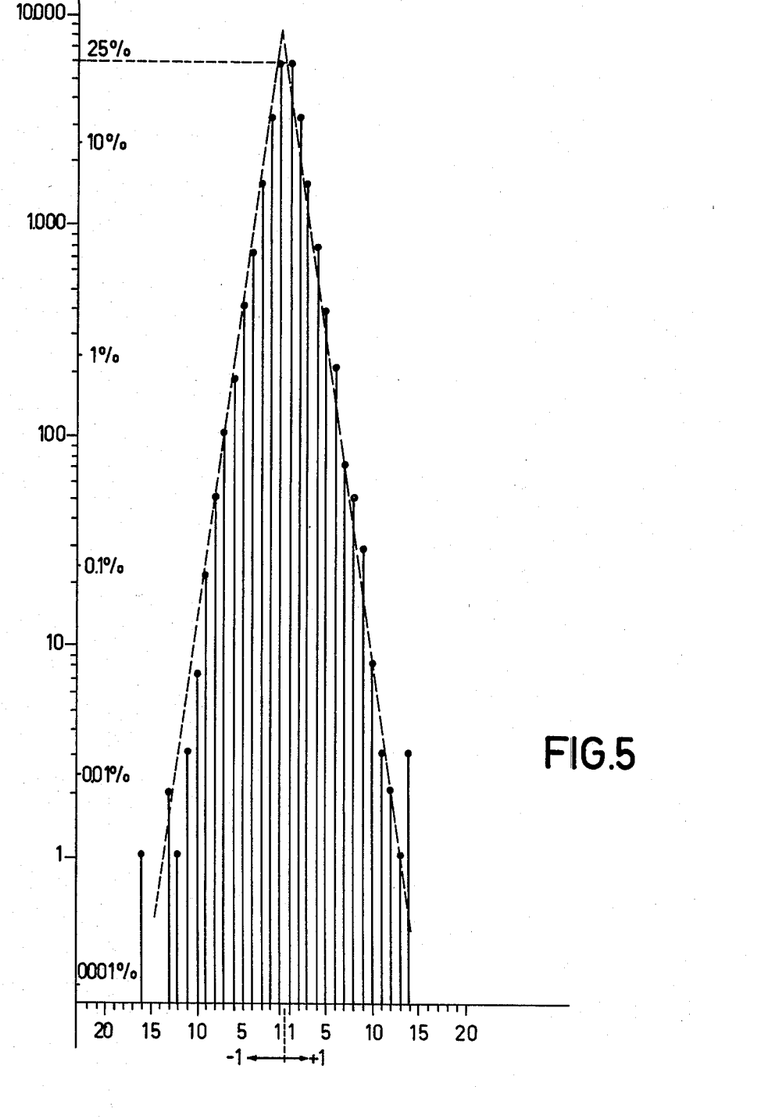
Figure 6:
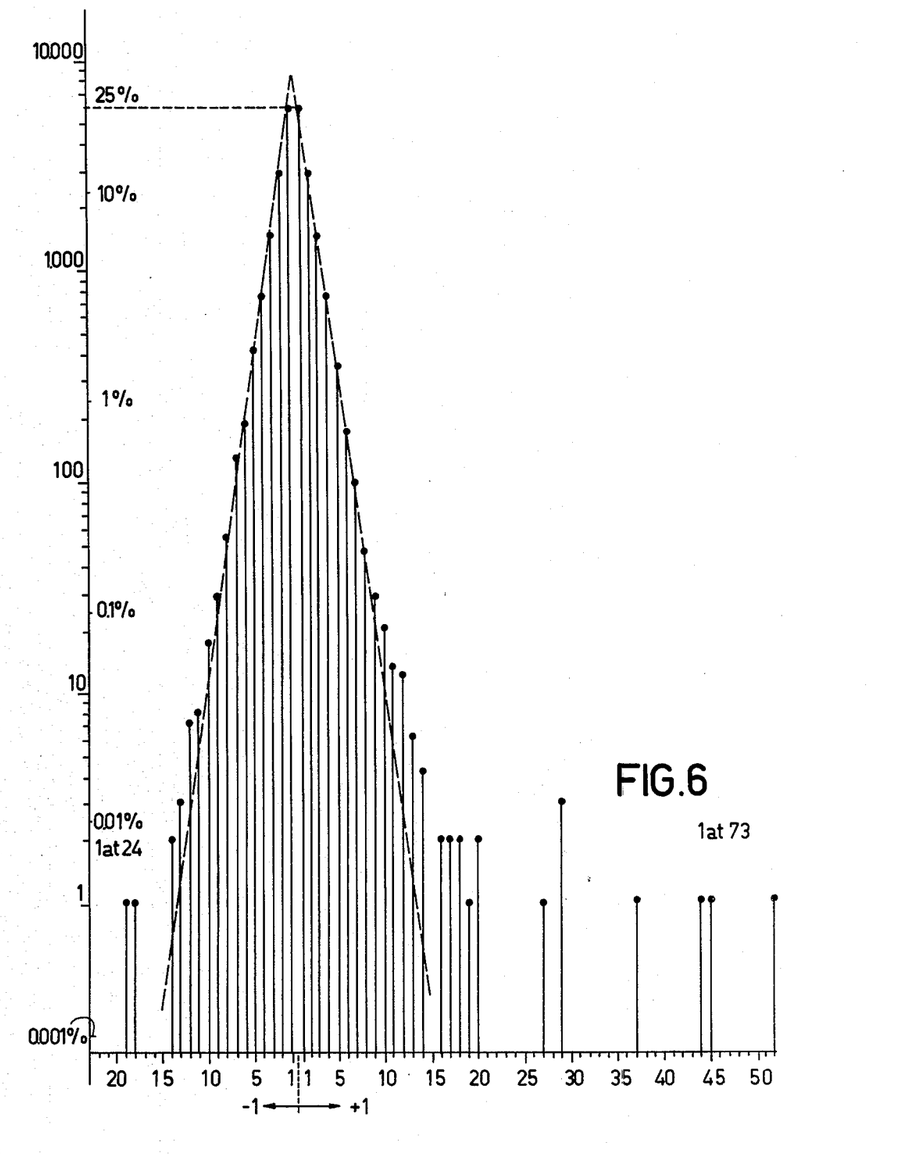

(3) Description of FIGS. 4, 5 and 6

FIG. 4 shows a possible embodiment of the run-length detector 21. The input 22 of the run-length detector 21 is provided by the input of a shift register 25 having p shift register elements. Each shift register element is provided by a bistable element having an output Q and an output $\overline{Q}$. The Q-output of each of the p shift register elements is connected to a first AND-gate 26 and the $\overline{Q}$-output of each of the p shift register elements is connected to a second AND-gate 27.

The output of the first AND-gate 26 and the output of the second AND-gate 27 are connected to an OR-gate 28, whose output 23 is the output of the run length detector 21. The run-length detector shown in FIG. 4 operates as follows:

The signals occurring with the clock rate 1/T at the output of the first multiplier (17 in FIG. 3) and which are representative of the sign of the correction step, are applied as sign bits having the value $+1$ or $-1$ to the input 22 of the shift register 25 and shifted therein with the clock rate 1/T. Each of the p shift register elements supplied an output voltage at its Q-output or at its $\overline{Q}$-output, depending on the value $+1$ or $-1$ of the sign bit applied to the relevant shift register element at the clock instant. The AND-gate 26 produces an output signal when exclusively all Q-outputs produce an output voltage, which is the case as soon as, and for the time that, all the sign bits stored in the p shift register elements have the same value +1. Similarly, the AND-gate 27 produces an output signal when exclusively all $\overline{Q}$-outputs produce an output voltage, which is the case as soon as, and for the time that, all the sign bits stored in the p shift register elements have the same value −1. When the AND-gate 26 or the AND-gate 27 produces an output signal this signal is applied as the switching signal to the two-position switch (24 in FIG. 3) via the OR-gate 28, causing this switch to be adjusted to the alternate position so that the larger step-size parameter $A\alpha$ is selected and applied to the second multiplier (18 in FIG. 3).

It will be clear that for a proper detection on the basis of run-length, i.e. on the basis of the value of the number of consecutive sign bits of the same value +1 and −1, respectively, the choice of the number (p) of shift register elements of shift register 25 is important.

By way of illustration, FIG. 5 and FIG. 6 show two diagrams, obtained by means of computer simulation and relating to the properly adjusted phase (FIG. 5) and to the beginning of the adjusting phase (FIG. 6). In both figures, the run length is plotted along the horizontal axis for +1 as well as for −1 values. The frequency of occurrence of a certain run-length is plotted on a logarithmic scale along the vertical axis. The solid vertical lines represent the results obtained from the simulation of an echo canceller having 20 coefficients and operating on the "sign algorithm" principle, each coefficient having been corrected 2400 times, so that the measuring results shown relate to 48,000 corrections in which approximately 24,000 runs were distinguished. Approximately 12,000 of these runs (i.e. 50%) had the length 1 (uniformly distributed over the +1 and −1 corrections); approximately 6,000 (i.e. 25%) had the length 2 (also uniformly distributed over the +1 and −1 corrections), etc. The broken lines show the theoretical result for independent, equally probable +1 and −1 values. At the beginning of the adjusting phase (FIG. 6) runs having a length in excess of 16 occur regularly, whereas they are very unlikely (0.002%) in the properly adjusted phase as shown by FIG. 5. This implies that the shift register 25 in the described embodiment has, for example, p=16 shift register elements. As soon as the run-length detector shown in FIG. 4, provided with such a shift register detects a sequence of 16 corrections of the same sign, the larger step-size parameter $A\alpha$ is selected instead of the smaller step-size parameter $\alpha$.

More generally, it may be said that the run-length detector shown in FIG. 4 effects the selection of the larger step-size parameter $A\alpha$, as soon as the detector ascertains that m consecutive sign bits have the same value.

It is alternatively possible to construct the run-length detector so that it effects the selection of the larger step-size parameter $A\alpha$ as soon as the detector ascertains that within a group of m consecutive sign bits a fixed number of n sign bits of the same value occur, wherein n<m, this fixed number of sign bits being the detection criterion. To this end, the run-length detector must be constructed as a n-out of m-code detector. Such a detector is known per se and comprises a sorting register consisting of m cascaded storage elements for sorting the bits having the values 0 and 1, written into the register an input device for writing the groups of bits into the register and a decision circuit connected, in accordance with the test criterion (n bits of the same value) to an information input of at least one of the storage elements of the sorting register and supplying a 1- or a 0-signal depending on whether the applied group of bits contains or does not contain at least n bits of the same value and consequently satisfies the test criterion.

For a detailed description of such a detector reference is made to U.S. Pat. No. 3,764,991.

Figure 7:
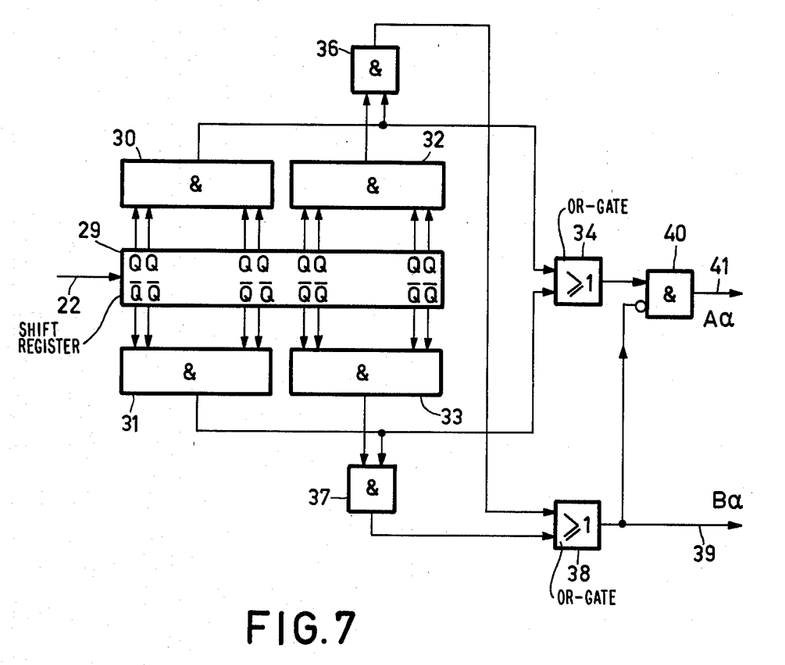
FIG. 7 shows a further possible embodiment of the run-length detector.

FIG. 7 shows a further possible embodiment of a run-length detector which enables the selection of three step-size parameters $\alpha$, $A\alpha$ and $B\alpha$, wherein $B>A>1$.

(4) Description of FIG. 7

The input 22 of this embodiment of the run-length detector is provided by the input of a shift register 29 having, for example, 20 shift register elements. Each shift register element is in the form of a bistable element having an output Q and an output $\overline{Q}$, these outputs being inverse to one another. The Q-output of each of the first 16 shift register elements is connected to a first AND-gate 30 and the $\overline{Q}$-output of each of these first 16 shift register elements is connected to a second AND-gate 31.

The Q-output of each of the shift register elements 17 to 20 inclusive is connected to a third AND-gate 32 and the $\overline{Q}$-output of each of these shift register elements 17 to 20 inclusive is connected to a fourth AND-gate 33. The output of the first AND-gate 30 and the output of the second AND-gate 31 are connected to a first OR-gate 34. Further, the output of the first AND-gate 30 and the output of the third AND-gate 32 are connected to a fifth AND-gate 36 and the output of the second AND-gate 31 and the output of the fourth AND-gate 33 are connected to a sixth AND-gate 37. The output of the fifth AND-gate 36 and the output of the sixth AND-gate 37 are connected to a second OR-gate 38 whose output 39 provides an output of the run-length detector. The output of the first OR-gate 34 is connected directly to a first input of a seventh AND-gate 40, and the output of the said second OR-gate 38 is connected to a second, inverting, input of the seventh AND-gate 40, whose output provides another output 41 of the run-length detector. The embodiment of the run-length detector shown in FIG. 7 operates as follows.

Let it be assumed that the signals, which are representative of the sign of the correction step, occur again as sign bits having the value +1 or −1 at the input 22 of the shift register 29 with the clock rate 1/T; these sign bits are then shifted in the shift register with the same clock rate 1/T. Each of the 20 shift register elements produces an output voltage at its Q-output or at its $\overline{Q}$-output depending on whether the sign bit presented to the relevant shift register element has the value +1 or −1 at the clock instant. The first AND-gate 30 produces an output voltage when the Q-outputs of the shift register elements 1 to 16, inclusive produce an output voltage, which is the case as soon as, and for as long as, the sign bits stored in the shift register elements 1 to 16, inclusive all have the same value +1. The second AND-gate 31, on the contrary, produces an output voltage as soon as, and for as long as, the sign bits stored in the shift register elements 1 to 16, inclusive all have the same value −1. When the first AND-gate 30 or the second AND-gate 31 produces an output signal, this signal is applied via the first OR-gate 34 to the first input of the seventh AND-gate 40, which then produces, on the condition that no signal is applied to the inverting input, an output signal at its output 41 which serves as the switching signal for the selection of the step-size parameter Aα. The third AND-gate 32 produces an output signal when the sign bits stored in the shift register elements 17 to 20 inclusive all have the same value +1. The fourth AND-gate 33 produces, on the contrary an output signal when the sign bits stored in the shift register elements 17 to 20, inclusive all have the same value −1. The fifth AND-gate 36 produces an output signal when the first AND-gate 30 and the third AND-gate 32 both produce an output signal, which means that the sign bits stored in the shift register elements 1 to 20, inclusive, all have the same value +1. The sixth AND-gate 37 produces an output signal when the second AND-gate 31 and the fourth AND-gate 33 both produce an output signal, which is the case when the sign bits stored in the shift register elements 1 to 20, inclusive, all have the same value −1. When the fifth AND-gate 36 or the sixth AND-gate 37 produces an output signal, this signal is applied to the second OR-gate 38 which then produces at its output 39 an output signal which serves as the switching signal for the selection of the step-size parameter Bα.

The output signal of the second OR-gate 38 is also applied as an "inhibit" signal to the inverting input of the AND-gate 40, to interrupt the output signal of the AND-gate 40.

Figure 8:
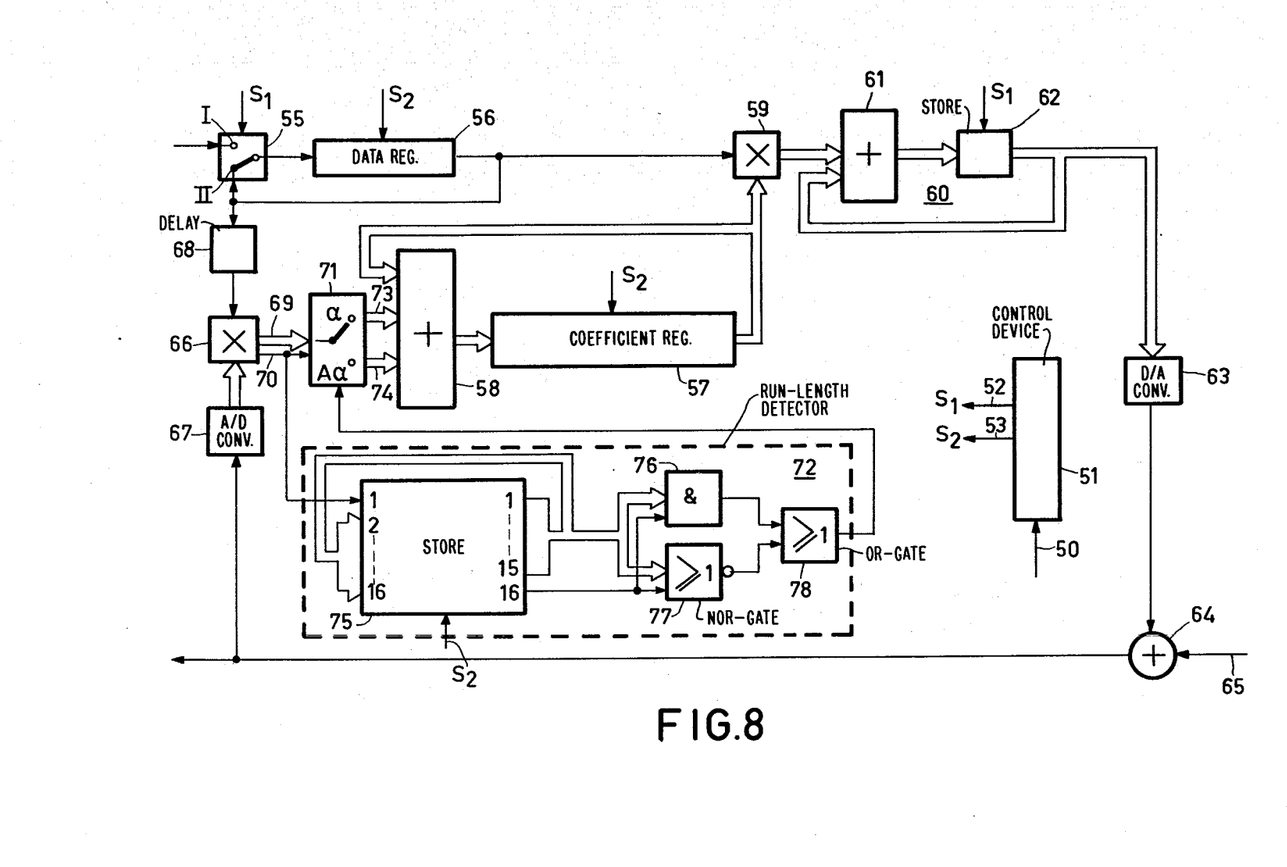
FIG. 8 shows a digital implementation of an echo canceller according to the invention.

(5) Description of FIG. 8

FIG. 8 shows the block schematic circuit diagram of an advantageous embodiment of a digital echo canceller according to the invention. This embodiment differs from the embodiment described with reference to FIG. 3 by its sequential structure, which results in a considerable saving of components without the internal processing speed becoming extremely high.

The description of FIG. 8 is based on the assumption that the adaptive filter in the arrangement shown is a transversal filter having X filter coefficients, each having Y bits and corrected by means of the stochastic iteration algorithm. The device is controlled by a clock signal having the symbol rate 1/T. In FIG. 8 this clock signal is applied to the input 50 of a control device 51 generating the control signals required for signal processing. Control device 51 has outputs 52 and 53 at which there are available a control signal $S_1$ with rate 1/T and a control signal $S_2$ with rate X/T, respectively.

The transversal filter portion of the echo canceller shown in FIG. 8 comprises a two-position switch 55 controlled by control signal $S_1$, and a data register 56, controlled by signal $S_2$.

At the beginning of each symbol period T, signal $S_1$ adjusts switch 55 briefly to position I, causing a sample of the binary data symbols to be written into data register 56. For the remaining portion of each symbol period T switch 55 is in position II, wherein the output of data register 56 is connected to its input, so that data register 56 then functions as a circulating register at whose output the (X−1) previous data samples and the new data sample occur consecutively with the rate X/T. This transversal filter portion further comprises a coefficient register 57 in which the X filter coefficients are stored. The output of coefficient register 57 is connected to its input via an adder 58. Coefficient register 57 is controlled by signal $S_2$ so that the filter coefficients circulate therein also with the rate X/T.

The data samples at the output of data register 56 and the filter coefficients at the output of coefficient register 57 are multiplied in a multiplier 59 so that in each symbol period T there occur at the output of this multiplier X products, which are accumulated in an accumulator 60 to form a sample of the approximated echo signal. Accumulator 60 comprises an adder 61 and a store 62, which latter is so controlled by the signal $S_1$ that a sample of the approximated echo signal occurs at the end of each symbol period T at the output of the accumulator 60. Via a digital-to-analog converter 63, these samples of the approximated echo signal are applied to difference determining circuit 64 for subtraction from the incoming signal, applied to the difference determining circuit 64 via an input 65, to form the residual error signal.

The correlator portion of the echo canceller shown in FIG. 8 comprises a multiplier 66 which is connected to the output of comparator 64 via an analog-to-digital converter 67 and to the output of the data register 56 via a delay network 68, which latter has for its function to compensate for differences in delay. The data samples at the output of the delay network 68 and the samples of the residual error signal occurring at the output of the analog-to-digital converter 67 are multiplied in the multiplier 66, so that X products occur at the output 69 of this multiplier in each symbol period T. The polarity bits associated with these products occur at the output 70 of this multiplier 66. The correlator portion further comprises a gate circuit 71 connected to the outputs 69 and 70 and a run-length detector 72 connected to the output 70 and having an output signal which so controls the gate circuit 71 that each product occurring at the output 69 of the multiplier 66 is multiplied in the gate circuit 71 by the step-size parameter α or Aα, depending on whether the run-length of the values of the consecutive sign bits which hold for the relevant coefficient examined in the run length detector 72, satisfies or does not satisfy the run-length of p sign bits of the same value, which holds as the detection criterion. This multiplication is simply done by changing the significance of the bits since, by a forward or backward shift of one position, a binary coded value can be doubled or halved. For how many positions this shift must be effected, is determined by the selected step-size parameter α or Aα. When the products are multiplied by the selected step-size parameter α, they occur at the output 73 of the gate circuit 71, and when they are multiplied by the selected step-size parameter Aα, such a product occurs at the output 74 of the gate circuit 71. The outputs 73 and 74 are both connected to the adder 58 in which the X coefficients are sequentially corrected by the values applied to the adder.

In this embodiment of the echo canceller, the run-length detector 72 comprises a store 75, which is assembled from the series arrangement of p shift registers, each having q shift register elements, p being equal to the run length of p sign bits which hold as the detection criterion, and q being equal to the number of coefficients. The sign bits occurring at the output 70 of the multiplier 66 are applied to the input of the first shift register element of the first shift register.

The output of the last shift register element of each of the p shift registers is connected to an AND-gate 76 having p inputs and to a NOR-gate 77 having p inputs. The output of each of these gates is connected to an OR-gate 78. Assuming the run length of p=16 sign bits of the same value to be the detection criterion, then the store 75 comprises 16 shift registers. The contents of the shift register elements of each of the 16 shift registers are all simultaneously circulated under the control of the signal $S_2$, i.e. at the same rate X/T with which the X coefficients in the coefficient register 57 circulate.

From this it follows that at each instant in which a coefficient is applied from the coefficient register 57 to the adder 58 a sign bit appears at the output of each of the 16 shift registers, these sign bits together constituting the 16 sign bits whose values are representative of the sign of each of the 16 preceding corrections of this coefficient. When the sign bits applied to the AND-gate 76 and to the NOR-gate 77 do not all have the same value, neither the AND-gate 76 nor the NOR-gate 77 produces an output signal and consequently no output signal occurs at the output of the OR-gate 78. This means that the step-size parameter $\alpha$ is selected. If, however, the 16 sign bits applied to the AND-gate 76 and to the NOR-gate 77 all have the same value, the AND-gate 76 produces an output signal when the value of each of the 16 sign bits is $+1$ and, in contrast therewith, the NOR-gate 77 produces an output signal when the value of each of the 16 sign bits is $-1$. The output signal of the AND-gate 76 or the output signal of the NOR-gate 77 is applied as a switching signal to the gate circuit 71 via the OR-gate 78 for selecting the larger step-size parameter $A\alpha$.

It should furthermore be noted that in the arrangement shown in FIG. 3 the digital filter 1 may alternatively be constructed as an interpolating digital filter (see, for example, reference D.8).

It should also be noted that in the embodiment shown in FIG. 3 it is assumed that each of the correlators 16 comprises its own run-length detector 21. The arrangement shown in FIG. 3 also operates very satisfactorily if only that correlator 16 which is associated with the coefficient having the highest absolute value is provided with a run-length detector. In that case it will be possible that this run-length detector controls all the switches 24.

What is claimed is:

1. An arrangement comprising a non-recursive filter having an input sampling circuit and means coupled to this input sampling circuit for generating a sequence of delayed versions of a signal applied to said input sampling circuit, an output circuit formed by a summing device for producing a filter output signal, a difference determining circuit coupled to this output circuit, means for applying the filter output signal and a reference signal to said difference determining circuit to produce an error signal, means coupled between said generating means and said output circuit for weighting said sequence of delayed versions of the input signal in accordance with a respective sequence of coefficients, correlation circuit means coupled between the output of said difference determining circuit and said weighting means for generating and iteratively adjusting, in positive and negative correction steps, each of said coefficients in said sequence of coefficients, said correlation circuit means having means for varying the size of said correction steps whereby the prescribed function of said error signal is minimized, the step-size for each correction step being determined by a step-size parameter selected from several step-size parameter having different values, characterized in that said correlation circuit further comprises means for determining the sign of each of said correction steps coupled to said difference determining circuit and said means for varying the size of each correction step for each coefficient comprises a run-length detector coupled to said determining means for receiving the sign of each correction step and which, depending on the number of correction steps of the same sign occurring within a group of correction steps preceding the relevant iteration, selects a larger or a smaller step-size parameter.

2. An arrangement as claimed in claim 1, in which each coefficients are all adjusted simultaneously, characterized in that the correlation circuit means comprises a plurality of correlation circuits corresponding with the number of coefficients in said sequence coefficients, each correlation circuit comprising an associated run-length detector.

3. An arrangement as claimed in claim 2, characterized in that the run-length detector comprises a shift register having an input for applying to the shift register the signal which is representative of the sign of the correction step, the shift register comprising p shift register elements each having a Q-output and a $\overline{Q}$-output, a first AND-gate having respective inputs connected to the Q-outputs and a second AND-gate having respective inputs connected to the $\overline{Q}$-outputs, and an OR-gate having respective inputs connected to the output of said first AND-gate and to the output of said second AND-gate, this OR-gate producing a switching signal for selecting the larger of two step-size parameters of different values when either all the Q-outputs or all the $\overline{Q}$-outputs produce output signals.

4. An arrangement as claimed in claim 2, characterized in that each run-length detector comprises a shift register having an input for applying to the shift register the signal which is representative of the sign of the correction step, the shift register comprising $n=p+r$ shift register elements each having a Q-output and a $\overline{Q}$-output, a first AND-gate having respective inputs connected to all Q-outputs of the first group of p consecutive shift register elements, a second AND-gate having respective inputs connected to all the $\overline{Q}$-outputs of the said first group of p consecutive shift register elements, a third AND-gate having respective inputs connected to all the $\overline{Q}$-outputs of the second group of r consecutive shift register elements, a fourth AND-gate having respective inputs connected to all the Q-outputs of the said second group of r consecutive shift register elements, a first OR-gate having respective inputs connected to the outputs of said first and said second AND-gates, said first OR-gate producing a switching signal for selecting the second largest step-size parameter of three step-size parameters of different values when either all the Q-outputs of the said first group of p shift register elements or all the $\overline{O}$-outputs of this group produce an output signal, a fifth AND-gate having respective inputs connected to the outputs of the first and the third AND-gates, a sixth AND-gate having respective inputs connected to the outputs of the second and the fourth AND-gates, and a second OR-gate having respective inputs connected to the outputs of the fifth and the sixth AND-gates, this second OR-gate producing a switching signal for selecting the largest step-size parameter of said three step-size parameters of different values when either all the Q-outputs of both the first group of p consecutive shift register elements and the second group of r consecutive shift register elements, or all the $\overline{Q}$-outputs of these two groups of register elements produce an output signal.

5. An arrangement as claimed in claim 4, characterized in that each run-length detector comprises a seventh AND-gate having a non-inverting input and an inverting input wherein the output of the first OR-gate is connected to the non-inverting input thereof and the output of the second OR-gate is connected to the inverting input of said seventh AND-gate, the switching signal when occurring at the output of the second OR-gate interrupting the switching signal at the output of the first OR-gate.

6. An arrangement as claimed in claim 1, in which the coefficients are adjusted sequentially, characterized in that the run-length detector comprises a store including p shift registers each having q shift register elements (p=run length, q=number of coefficients) these shift registers being arranged in series and the input of the run length detector being provided by the input of the first shift register element of the first shift register, an AND-gate and a NOR-gate having respective inputs coupled to the output of the last shift register element of each of the p shift registers, and an OR-gate having inputs to which the outputs of said AND-gate and said NOR-gate are respectively connected, this OR-gate producing a switching signal for selecting the larger of two step-size parameters of different values each time the output signals, occurring at the output of each of the p shift registers, all have the same value (0 or 1).

* * * * *